United States Patent
Matsunaga et al.

(10) Patent No.: US 12,495,223 B2
(45) Date of Patent: Dec. 9, 2025

(54) IMAGE SENSOR AND OPTICAL SIGNAL GENERATION METHOD

(71) Applicant: OmniVision Technologies, Inc., Santa Clara, CA (US)

(72) Inventors: Yoshiyuki Matsunaga, Kyoto (JP); Keiji Mabuchi, Cupertino, CA (US); Lindsay Grant, Campbell, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 115 days.

(21) Appl. No.: 18/507,318

(22) Filed: Nov. 13, 2023

(65) Prior Publication Data

US 2025/0159373 A1    May 15, 2025

(51) Int. Cl.
  *H04N 25/65*    (2023.01)
  *H04N 23/667*    (2023.01)
  *H04N 25/771*    (2023.01)
  *H04N 25/772*    (2023.01)

(52) U.S. Cl.
  CPC .......... *H04N 25/65* (2023.01); *H04N 23/667* (2023.01); *H04N 25/771* (2023.01); *H04N 25/772* (2023.01)

(58) Field of Classification Search
  None
  See application file for complete search history.

(56) References Cited

U.S. PATENT DOCUMENTS

| | | | |
|---|---|---|---|
| 6,201,270 B1 * | 3/2001 | Chen | H10F 39/803 327/515 |
| 9,366,570 B1 * | 6/2016 | Wiser | G01J 1/44 |
| 2008/0251695 A1 * | 10/2008 | Kamon | H04N 25/7795 348/E3.018 |
| 2018/0098008 A1 * | 4/2018 | Mao | H10F 39/811 |
| 2020/0029044 A1 * | 1/2020 | Inui | H04N 25/57 |

FOREIGN PATENT DOCUMENTS

| | | | | |
|---|---|---|---|---|
| EP | 1265291 A1 * | 12/2002 | ....... | H01L 27/14609 |
| JP | 2008028474 A * | 2/2008 | ....... | H01L 27/14609 |

OTHER PUBLICATIONS

English translation of JP-2008028474-A, Miyatake, 2008 (Year: 2008).*
English translation of EP-1265291-A1, Doering, 2002 (Year: 2002).*

* cited by examiner

*Primary Examiner* — James M Hannett

(57) ABSTRACT

An image sensor includes a plurality of pixels and includes a photodiode configured to operate in both modes of a linear mode for linearly responding to a light incident amount and a photo-voltaic mode for logarithmically responding to the light incident amount, a source follower circuit configured to output a signal voltage according to a signal generated according to an output of the photodiode, an AD converter configured to convert the signal voltage output from the source follower circuit into digital signal data, a frame memory configured to store signal data of one frame, and a conversion function configured to generate, from signal data of a current frame and signal data of a previous frame, an optical signal relating to the light incident amount.

10 Claims, 8 Drawing Sheets

IMAGE SENSOR AND OPTICAL SIGNAL GENERATION METHOD

TECHNICAL FIELD

The present disclosure relates to an image sensor and an optical signal generation method which use a photodiode that operates in both modes of a linear mode for linearly responding to a light incident amount and a photo-voltaic mode for logarithmically responding to the light incident amount.

BACKGROUND

An image sensor includes photodiodes in pixel circuits and detects electric charge amounts generated according to lights made incident on the photodiodes.

The photodiodes have a logarithmic region (at a high illuminance time) in which the photodiodes operate with a forward bias and a linear region (at a low illuminance time) in which the photodiodes operate with a reverse bias and a part of the forward direction bias. In the logarithmic region, the photodiodes logarithmically respond to a light incident amount. An operation mode at this time is called a photo-voltaic mode. In the linear region, the photodiodes linearly respond to the light incident amount. An operation mode at this time is called a linear mode.

In the linear region where the photodiodes operate under low illuminance, thermal noise called kTC noise occurs. The kTC noise is noise due to switching of a reset transistor that resets accumulated electric charges of the photodiodes. The kTC noise is an offset shift, a shift direction of which is not fixed with respect to output voltages of the photodiodes after the reset. Therefore, the kTC noise deteriorates the quality of a reproduced image.

Therefore, it is desired to remove the kTC noise from outputs of the image sensors.

SUMMARY

An image sensor according to the present disclosure is an image sensor including a plurality of pixels, the image sensor including: a photodiode configured to operate in both modes of a linear mode for linearly responding to a light incident amount and a photo-voltaic mode for logarithmically responding to the light incident amount; a source follower circuit configured to output a signal voltage according to a signal generated according to an output of the photodiode; an AD converter configured to convert the signal voltage output from the source follower circuit into digital signal data; a frame memory configured to store signal data of one frame; and a conversion function configured to generate, from signal data of a current frame and signal data of a previous frame, an optical signal relating to the light incident amount.

An optical signal generation method according to the present disclosure is an optical signal generation method for generating an optical signal relating to a light incident amount of a photodiode that operates in both modes of a linear mode for linearly responding to a light incident amount and a photo-voltaic mode for logarithmically responding to the light incident amount, the optical signal generation method including: extracting an output of the photodiode frame by frame without resetting an accumulated electric charge of the photodiode; and generating, based on a signal of a current frame relating to an output in the current frame of the photodiode and a signal of a previous frame relating to an output in an immediately preceding frame of the photodiode, an optical signal relating to the light incident amount in the current frame using a conversion function provided in advance.

With the image sensor and the optical signal generation method according to the present disclosure, it is possible to omit a reset transistor and suppress occurrence of noise. That is, it is possible to obtain a signal without connecting the reset transistor to an output end of the photodiode and without resetting the accumulated electric charges of the photodiode. Therefore, it is possible to prevent occurrence of noise due to the reset.

BRIEF DESCRIPTION OF DRAWINGS

An embodiment of the present disclosure will be described based on the following figures, wherein.

DESCRIPTION OF EMBODIMENT

An embodiment of the present disclosure is explained below with reference to the drawings. Note that the embodiment explained below does not limit the present disclosure. A configuration formed by selectively combining a plurality of illustrations is also included in the present disclosure.

"Circuit Configuration"

Figure 1:
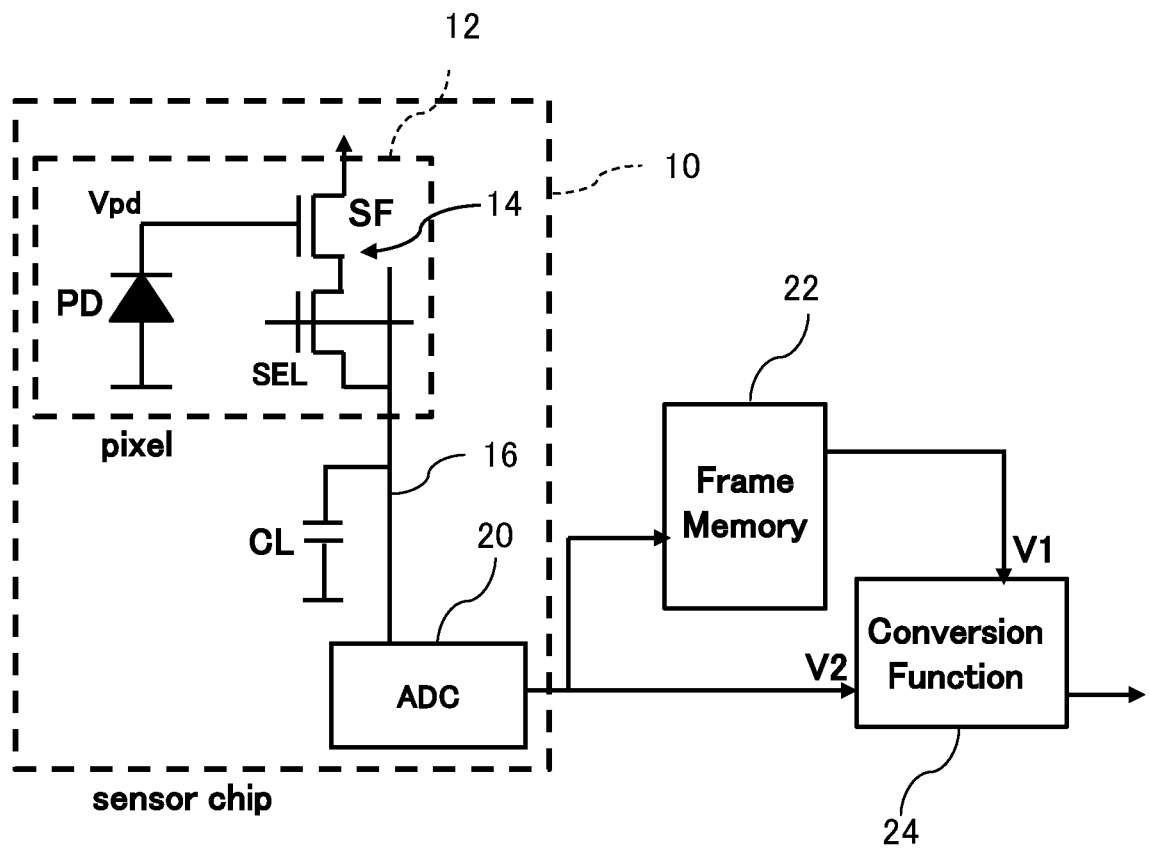
FIG. 1 is a diagram illustrating a configuration of a pixel circuit in an image sensor according to an embodiment.

FIG. 1 is a diagram illustrating a configuration of a pixel circuit in an image sensor according to the embodiment.

In a sensor chip 10, a plurality of pixels 12 are formed on a semiconductor substrate such as a silicon substrate. The sensor chip 10 includes the plurality of pixels 12 arranged in a matrix in the horizontal direction and the vertical direction. In FIG. 1, only one pixel 12 is illustrated.

The pixel 12 includes a photodiode PD. The photodiode PD has a pn junction and generates electric charges with incident light. The photodiode PD in this example generates electrons with the incident light. An output voltage of the photodiode PD is larger on a minus side as an incident light amount is larger.

The photodiode PD has two modes of a linear mode for linearly responding to a light incident amount at a reverse bias time and a forward bias time and a photo-voltaic mode for logarithmically responding to the light incident amount at the forward bias time. The photodiode PD is in the linear mode when the incident light amount is small and is in the photo-voltaic mode when the incident light amount is large.

A source follower circuit 14 is connected to an output of the photodiode PD. The source follower circuit 14 includes a source follower transistor SF configured from an n-channel MOSFET and a row selection transistor SEL configured from an n-channel MOSFET.

The output of the photodiode PD is connected to a gate of the source follower transistor SF. A drain of the source follower transistor SF is connected to a predetermined power supply. A drain of the row selection transistor SEL is connected to a source of the source follower transistor SF. A source of the row selection transistor SEL is connected to a bit line 16, which is an output line. A row selection line connected to a vertical scan circuit explained below is connected to a gate of the row selection transistor SEL.

Therefore, the row selection line changes to a high level (H level), whereby the row selection transistor SEL is turned on and a voltage corresponding to a gate voltage of the source follower transistor SF is output to the bit line 16. The output of the photodiode PD is supplied to the gate of the source follower transistor SF. A signal voltage corresponding to an output voltage of the photodiode PD is output to the bit line 16. That is, a signal voltage relating to an incident light amount of the photodiode PD is output to the bit line 16. Bit lines 16 are provided to correspond to columns. Sources of row selection transistors SEL of the plurality of pixels 12 arranged in the vertical direction are connected to one bit line 16.

One end of a load capacitor CL is connected to the bit line 16. The other end of the load capacitor CL is connected to the predetermined power supply such as the ground. The bit line 16 is a wire long in the vertical direction (the column direction). Parasitic capacitance generated in the bit line 16 is considerably large. Therefore, the parasitic capacitance may be caused to function as the load capacitor CL.

The bit line 16 is connected to an AD converter (ADC) 20. Therefore, signal voltages of the plurality of pixels 12 in a row selected by the row selection line are supplied to the AD converter 20.

The AD converter 20 converts supplied analog signal voltages into digital signal data. The obtained signal data is supplied to both of a frame memory 22 and a conversion function 24. The frame memory 22 stores signal data for one frame. An output of the frame memory 22 is connected to the conversion function 24. Signal data of the immediately preceding frame is supplied to the conversion function 24. Note that frame is described as Fr as appropriate.

A signal V2 at present (of a current frame) and a signal V1 of the immediately preceding frame (a previous frame) are supplied to the conversion function 24. The conversion function 24 is configured by a Lambert W function and outputs, from two input data, optical signals in the current frame in the pixels. That is, the conversion function 24 eliminates the influence of the previous signal V1 from the current signal V2 and obtains an optical signal corresponding to an incident light amount of the current frame.

In this embodiment, a reset circuit that resets an output of the photodiode PD to a predetermined voltage is not provided. Therefore, the photodiode PD retains accumulated electric charges in the previous frame at a first point in time of one frame. The conversion function 24 obtains the optical signal corresponding to the incident light amount in the current frame from the signal V2 of the current frame and signal data of the previous frame. Here, this conversion cannot be calculated by an elementary function. The conversion can be calculated if the Lambert W function is used.

The lambert W function is an inverse function including linear x and an exponential function $e^x$. That is, the Lambert W function is a general term of a function W obtained as a branch of an inverse relation of a function $f(z)=ze^z$. Here, $e^z$ represents an exponential function and z represents any complex number. W satisfies $z=f^{-1}(ze^z)=W(ze^z)$.

Since the photodiode PD includes the linear region and the logarithmic region, the photodiode PD can determine a formula for obtaining a signal current Isig corresponding to the two inputs of V1 and V2 by applying the Lambert W function. The Lambert W function is a popular function included in, for example, built-in functions of EXCEL (registered trademark) of Microsoft Corporation in the United States and can be used as appropriate.

Numerical value tables for calculating the optical signal: Isig, which is a solution, from the two inputs (the signals V1 and V2) can be created by various experiments, simulations, and the like. Consequently, it is possible to obtain an optical signal by referring to two tables. It is also possible to register an approximation and output an operation result.

Figure 2:
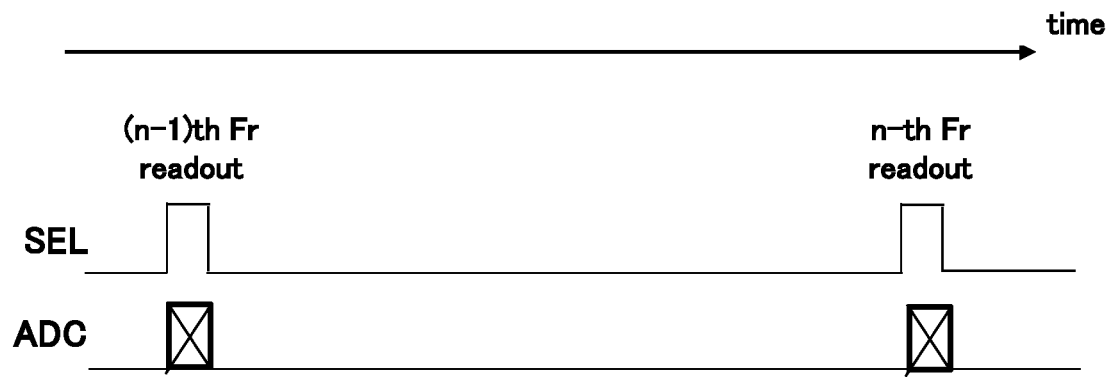
FIG. 2 is a timing chart illustrating an operation of the circuit illustrated in FIG. 1.

FIG. 2 is a timing chart illustrating an operation of the circuit illustrated in FIG. 1. When the selection transistors SEL in the pixels 12 in one row (one horizontal line) are turned on, signals corresponding to outputs of the photodiodes PD in columns of the line are read out to the bit lines 16 corresponding to the selection transistors SEL. The read-out signals are supplied to the ADC 20 and AD-converted by the ADC 20 and the signal V2 of the current frame of the pixels 12 in one line is output. The signal V2 is supplied to the frame memory 22 and the conversion function 24. A signal (a signal of one line) relating to an incident light amount of the current frame is output from the conversion function 24. It is possible to obtain an image signal of one frame by repeating such an operation for each one horizontal line in a period of one frame.

About a Configuration of a Comparative Example

Figure 3:
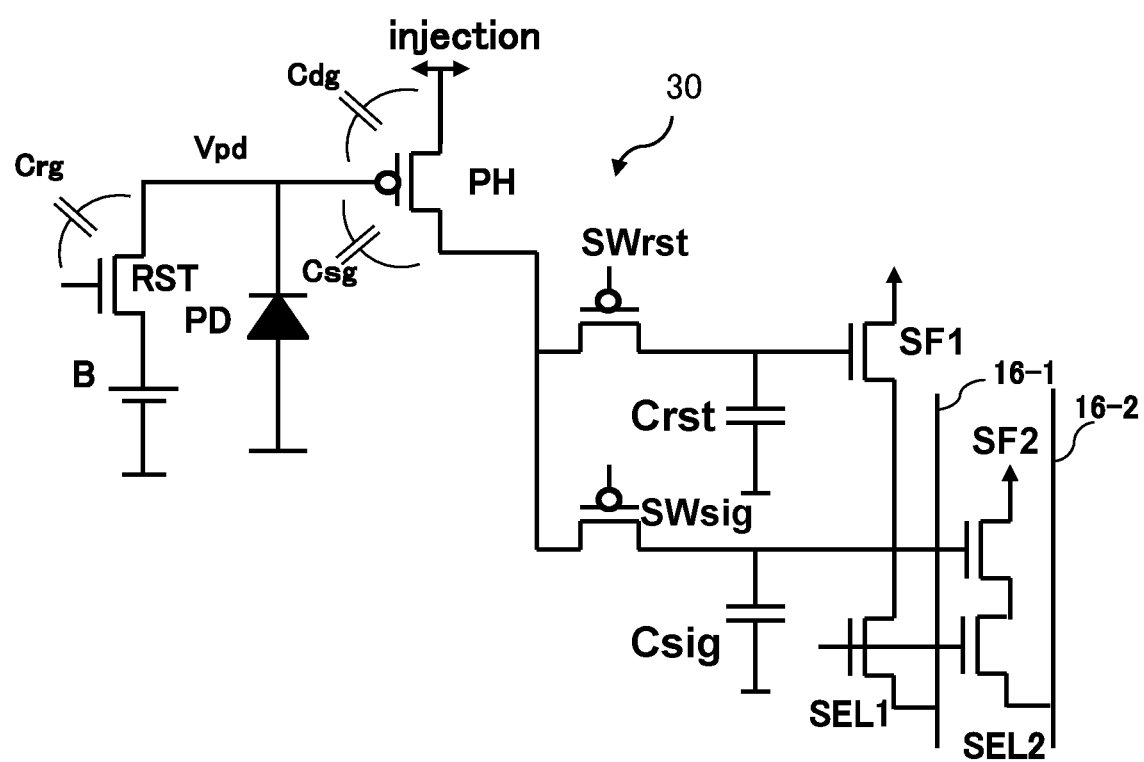
FIG. 3 is a diagram illustrating a configuration of a comparative example.

FIG. 3 is a diagram illustrating a configuration of a comparative example. In this comparative example, an image sensor includes a reset transistor RST and includes a peak hold circuit 30. The image sensor can separately output a noise signal (a signal for KTC noise) immediately after reset by the reset transistor RST and an optical signal corresponding to accumulated electric charges of the photodiode PD.

The photodiode PD accumulates electric charges (in this case, electrons) according to light made incident thereon. A cathode side of the photodiode PD is an output end. An anode side of the photodiode PD is connected to a power supply (for example, the ground). Note that, in this embodiment, a field effect transistor (FET) is used as a transistor.

One end (a drain) of the reset transistor RST is connected to the output end of the photodiode PD. The other end (a source) of the reset transistor RST is connected to the power supply (for example, the ground) via a reset power supply B. In this example, the reset transistor RST is an n-channel transistor.

The cathode of the photodiode PD is connected to a gate of a peak hold transistor PH. The peak hold transistor PH is a p-channel transistor. A source of the peak hold transistor PH is connected to an injection power supply. Sources of a first switch transistor SWrst and a second switch transistor SWsig are connected to a drain of the peak hold transistor PH. One end of a first capacitor Crst is connected to a drain of the first switch transistor SWrst. One end of a second capacitor Csig is connected to a drain of the second switch transistor SWsig. The other ends of the first capacitor Crst and the second capacitor Csig are connected to the power supply (for example, the ground). The first switch transistor SWrst and the second switch transistor SWsig are p-channel transistors.

A source of the first switch transistor SWrst is connected to a gate of a first source follower transistor SF1. A drain of the first source follower transistor SF1 is connected to the power supply and a source of the first source follower transistor SF1 is connected to a drain of a first selection transistor SEL1. A source of the first selection transistor SEL1 is connected to a first bit line 16-1.

A source of the second switch transistor SWsig is connected to a gate of a second source follower transistor SF2. A drain of the second source follower transistor SF2 is connected to the power supply and a source of the second source follower transistor SF2 is connected to a drain of a second selection transistor SEL2. A source of the second selection transistor SEL2 is connected to a second bit line 16-2.

Gates of the first selection transistor SEL1 and the second selection transistor SEL2 are connected in common. A row selection signal is supplied to the gates. The row selection signal changes to an H level, whereby a signal corresponding to a gate voltage of the first source follower transistor SF1 is output to the bit line 16-1 and a signal corresponding to a gate voltage of the second source follower transistor SF2 is output to the second bit line 16-2.

As explained above, this pixel circuit includes two switch transistors SWrst and SWsig and two capacitors Crst and Csig. The first capacitor Crst accumulates only kTC noise immediately after reset. The second capacitor Csig accumulates an optical signal and kTC noise (S+N) in one frame period. The noise (N) is output from the first capacitor Crst to the first bit line 16-1. The optical signal+noise (S+N) is output from the second capacitor Csig to the second bit line 16-2. These two output signals are supplied to an external circuit. The kTC noise is removed from the output signal of the second capacitor Csig by subtracting the noise (N) from the optical signal+noise (S+N) (S+N−N=S).

Here, in this pixel circuit, the sensitivity of the Linear region is determined by charge voltage conversion capacitance C and noise N of a circuit connected to the photodiode PD.

The charge voltage conversion capacitance C is Cpd+Crg+Cdg+Csg. A value of Crg relatively greatly deteriorates the sensitivity. Noises N of the PD and the subsequent components are mainly determined by Crst and Csig in the case of FIG. 3 and are respectively $\sqrt{(KT/2Crst)}$ and $\sqrt{(KT/2Csig)}$.

These noises are thermal noises, determined by an inverse of a square root of a capacitance value, and is approximately ⅕ of kTC noise of the photodiode PD.

"About Noise in Circuits Illustrated in FIG. 1 and FIG. 3"

Here, in this embodiment, a reset transistor that supplies a predetermined reset voltage to the output end of the photodiode PD and resets accumulated electric charges of the photodiode PD is not provided. Consequently, it is possible to reduce the charge voltage conversion capacitance C at the output end of the photodiode PD.

In the image sensor in which the photodiode PD of the related art is used, a transfer gate is often provided in the output of the photodiode PD. In the configuration illustrated in FIG. 1, since the image sensor does not include the transfer gate, the charge voltage conversion capacitance C decreases to approximately ½.

As explained above, in this embodiment, the charge voltage conversion capacitance C can be reduced. Therefore, the sensitivity of the pixel circuit can be increased to approximately 1.4 times to two times compared with the related art.

The configuration illustrated in FIG. 3 includes the peak hold transistor PH and the capacitors Crst and Csig connected to the peak hold transistor PH. On the other hand, the circuit illustrated in FIG. 1 does not include these circuits. Therefore, in the circuit illustrated in FIG. 1, noise is determined by the capacitor CL of the source follower transistor SF. A value of the noise is $\sqrt{(KT/CL)}$. The capacitance of the capacitor CL can be designed ten to twenty times larger compared with the capacitance of the capacitors Crst and Csig connected to the PH circuit. This is because, whereas the capacitors Crst and Csig are formed in a narrow pixel, the capacitor CL is a long wire because the capacitor CL is common to all pixels arrayed in the vertical direction. Since the noise is proportional to an inverse of a square root of capacitance, the noise is suppressed to 0.3 to 0.22 times.

"About the Influence of the Signal V1"

Figure 4:
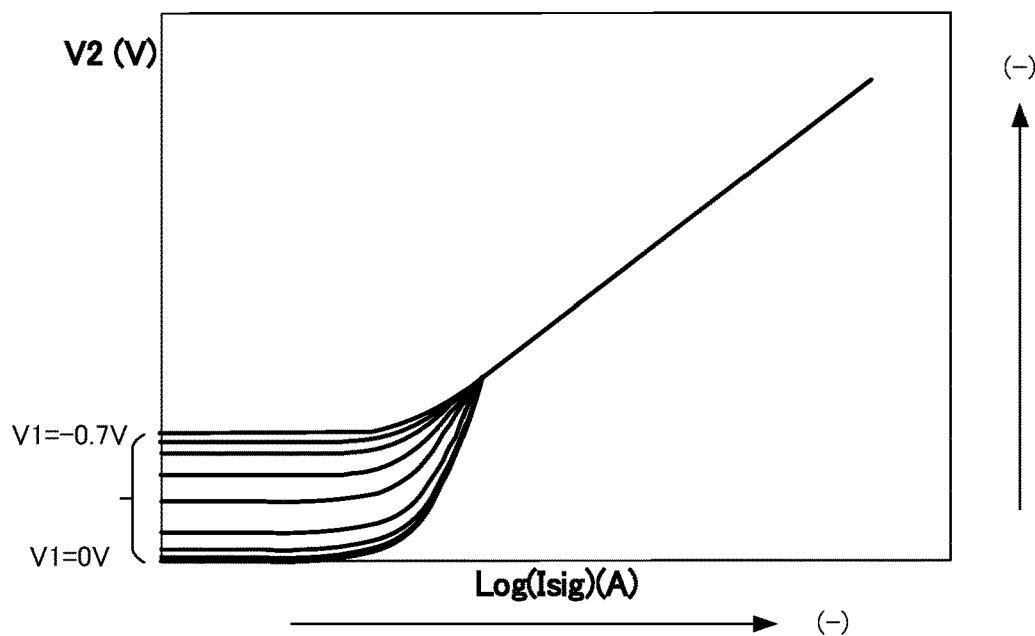
FIG. 4 is a diagram illustrating a relation in the case in which a signal current corresponding to a signal of an immediately preceding frame and an optical signal is given and a signal of a current frame is calculated.

FIG. 4 is a diagram illustrating a relation in the case in which the signal current Isig corresponding to the signal V1 of the immediately preceding frame and an optical signal is given and the signal V2 of the current frame is calculated. The horizontal axis indicates a Log (Isig) and the vertical axis indicates V2. V2 in the case in which V1 is changed between 0V and 0.7V is illustrated.

In FIG. 4, a left region where the signal current is small is the Linear region. As illustrated in FIG. 4, the signal V2 of the current frame depends on a value of the signal V1 of the immediately preceding frame. This is because electric charges are integrated in the Linear region. On the other hand, in the Log region where the signal current is large, an output of the photodiode PD corresponds to an incident light amount at that point in time. Therefore, the signal V2 of the current frame does not depend on the signal V1 of the previous frame. Therefore, it is unnecessary to use the conversion function 24.

Figure 5:
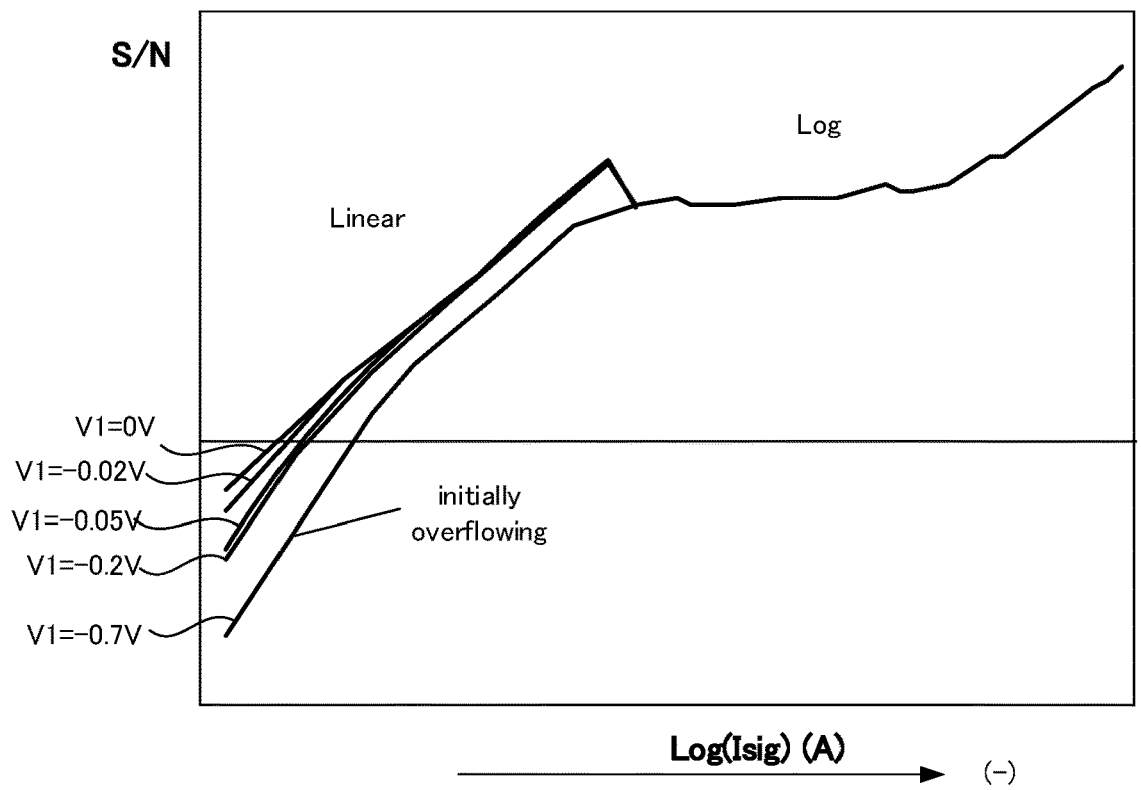
FIG. 5 is a diagram illustrating S/Ns in a Linear region and a Log region at V1=0V to −0.7V.

FIG. 5 is a diagram illustrating S/Ns in the Linear region at V1=0V to −0.7V. The horizontal axis indicates a Log (Isig) and the vertical axis indicates an S/N.

For example, when V1 is 0V, that is, there is no signal in the immediately preceding Fr, the S/N is better by approximately 10 dB than when CDS is performed in the PH circuit of the related art. When V1 increases, the S/N is deteriorated. Here, the S/N in the circuit of the comparative example is a second from the bottom and indicates an S/N substantially the same as V1=−0.2V. In this embodiment, when the S/N is closer to 0 than V1=−0.2V, the S/N is better in this embodiment. In particular, it is seen that the S/N is improved in a dark region where the signal current Isig is small.

"Configuration of the Image Sensor"

Figure 6:
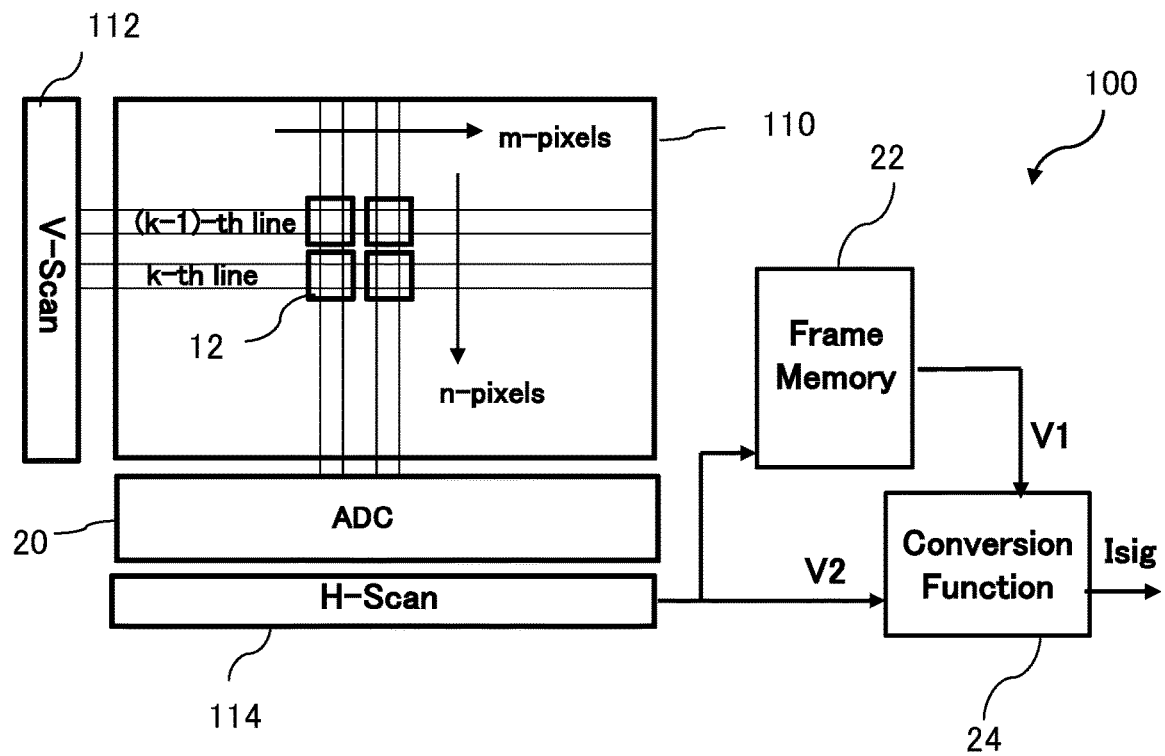
FIG. 6 is a diagram illustrating the image sensor in which pixels are two-dimensionally arranged in the embodiment.

FIG. 6 is a diagram illustrating an image sensor 100 in which pixels are two-dimensionally arranged in the embodiment. A pixel array 110 includes the pixels 12 explained above in m columns*n rows (m*n), that is, m pixels in the horizontal direction and n pixels in the vertical direction. A vertical scan circuit (V-Scan) 112 sequentially selects rows of pixels P in the vertical direction. The pixels in the columns are connected to the AD converter (ADC) 20 by a read-out line in the vertical direction. A horizontal scan circuit (H-scan) 114 is connected to the ADC 20. Image signals of the pixels are sequentially output from the horizontal scan circuit (H-scan) 114.

Figure 7:
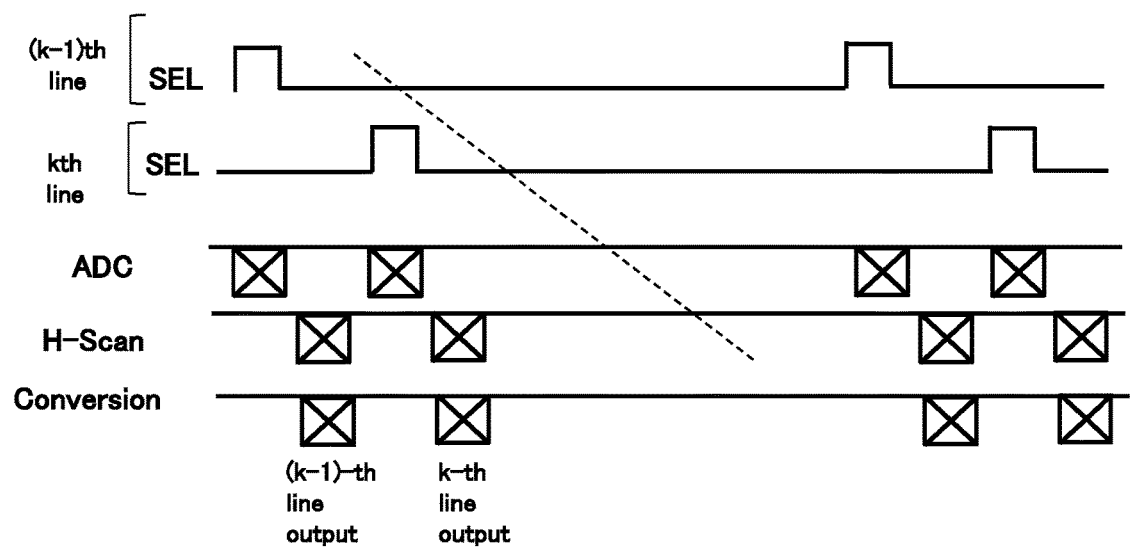
FIG. 7 is a timing chart illustrating an operation of the image sensor.

FIG. 7 is a timing chart illustrating an operation of the image sensor 100.

In a (k−1)-th row, the selection transistor SEL is turned on and a signal obtained in one vertical period (one Fr) in the photodiode (PD) 10 is supplied to the ADC 20. Then, the next exposure of 1 Fr is started. A read-out signal is supplied to the ADC 20 and converted into a digital signal V2 in the ADC 20. This operation is simultaneously performed for the m pixels of one horizontal line. Thereafter, a horizontal scan circuit (H-scan) 216 sequentially supplies digital signals of the m pixels to the frame memory 22 and the conversion function 24. The signal V2 of the immediately preceding frame is read out from the frame memory 22 and supplied to the conversion function 24. The conversion function 24 calculates the signal current Isig from the supplied signals V1 and V2 and outputs the signal current Isig. The conversion function 24 calculates the signal current Isig with a conversion function from the digital signal V2 and the signal V1 stored in the frame memory 22 in the immediately preceding Fr. This signal processing is performed for the m pixels.

Subsequently, a horizontal cycle is shifted by 1H and the same operation is performed for a k-th row. By repeating the operation n times, readout from all of the m*n pixels can be performed.

It is also possible to output the two signals to the outside from the image sensor 100 and remove noise from an optical signal+noise with the external circuit.

Here, as illustrated in FIG. 5, the S/N is deteriorated in the region where V1 is large. One cause of the deterioration in the S/N is that a current voltage conversion coefficient (dV2/dIsig) decreases when V1 increases.

Modification 1

Figure 8:
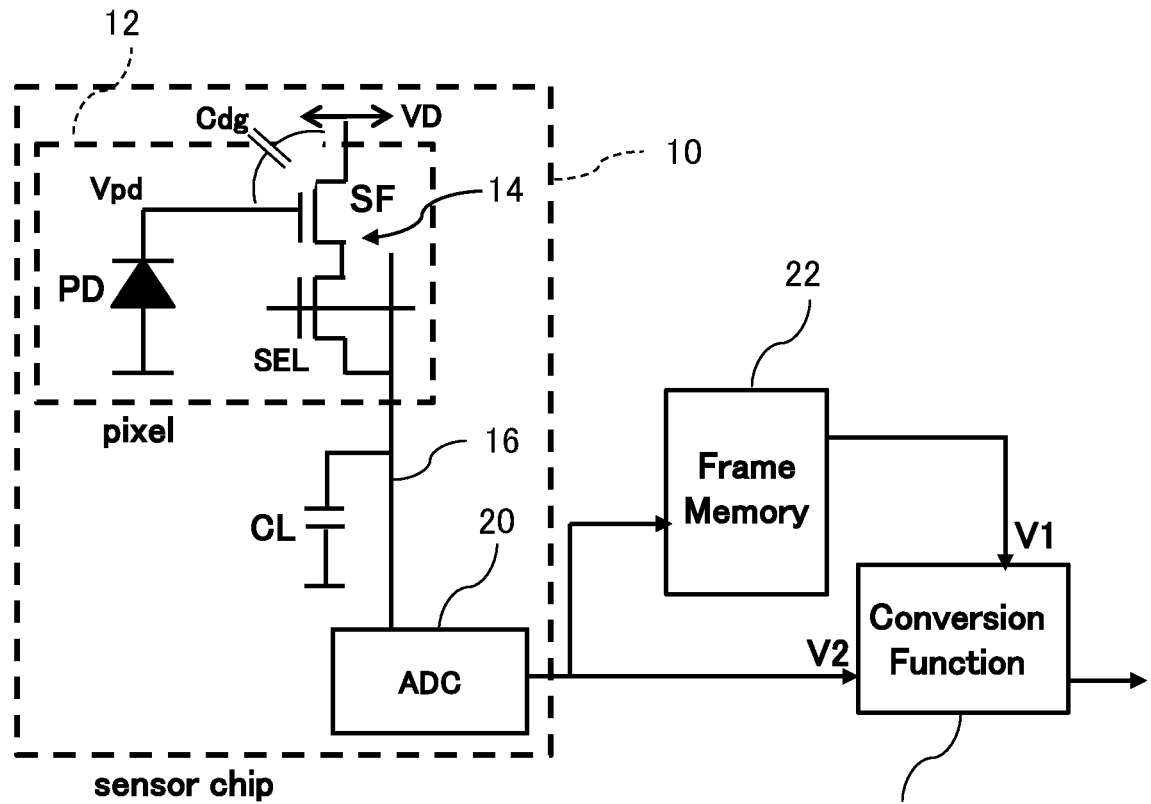
FIG. 8 is a diagram illustrating a configuration of a modification 1.
Figure 9:
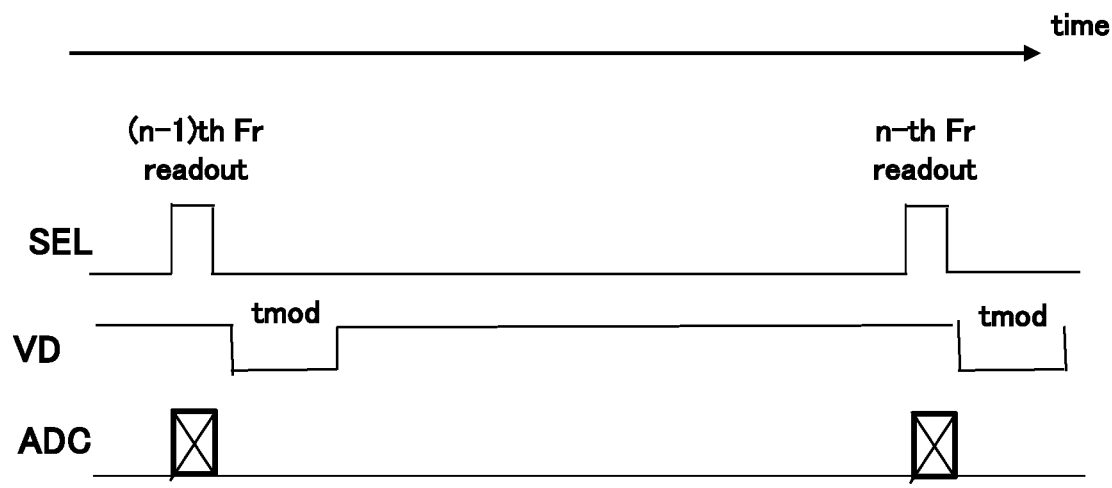
FIG. 9 is a timing chart illustrating an operation of the modification 1.

FIG. 8 is a diagram illustrating a configuration of a modification 1. FIG. 9 is a timing chart illustrating an operation of the modification 1.

A negative pulse is applied to a drain voltage VD of the source follower transistor SF. A voltage of the PD is modulated by a drain-gate capacitor (a gate capacitor) Cgd of the source follower transistor SF. That is, the negative pulse for reducing the voltage is applied to the voltage VD for a predetermined application period tmod. The voltage VD is usually 2.8V, V1 is assumed to be 0 to −0.7V, and the negative pulse is set to −0.2V.

Figure 10:
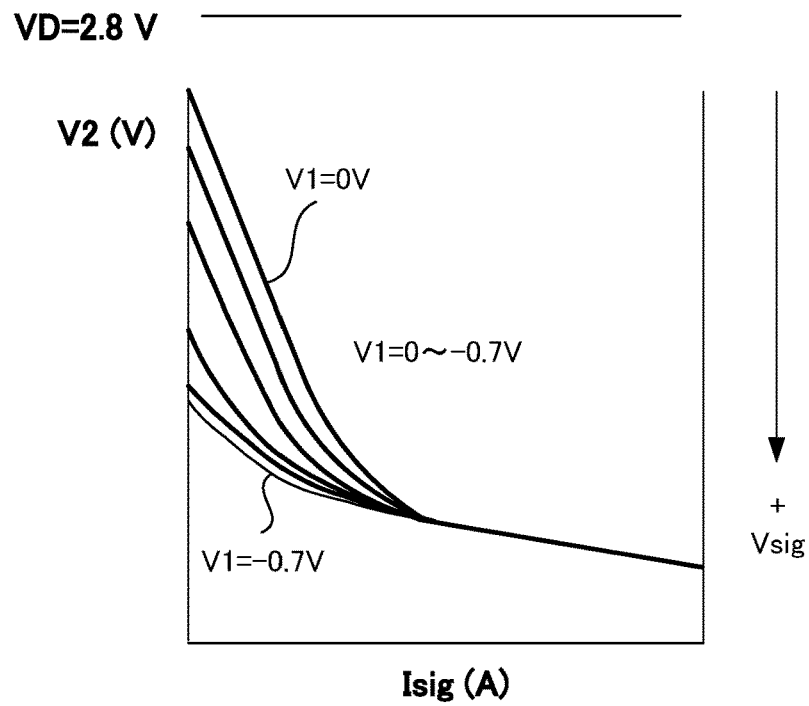
FIG. 10 is a diagram illustrating a relation of the signal (an output voltage) with the signal current and illustrates a case in which a negative pulse is not applied.
Figure 11:
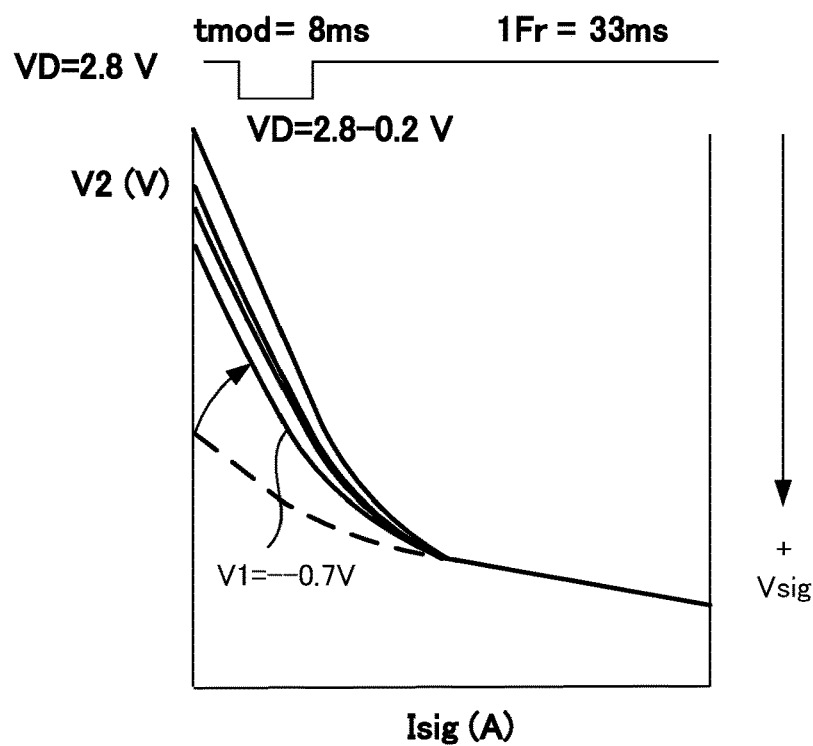
FIG. 11 is a diagram illustrating a relation of the signal (the output voltage) with the signal current and illustrates a case in which the negative pulse is applied.

FIGS. 10 and 11 are diagrams illustrating a relation of the signal (the output voltage) V2 with the signal current Isig. FIG. 10 illustrates the relation in the case in which the negative pulse is not applied. FIG. 11 illustrates the relation in the case in which the negative pulse is applied. In this example, one frame period (one Fr)=33 ms and the negative pulse application period tmod=8 ms.

When the negative pulse is applied to the voltage VD as explained above, the negative pulse is applied to the output end of the photodiode PD via the capacitor Cgd of the source follower transistor SF. The voltage at the output end of the photodiode PD drops. Consequently, the photodiode PD is put is a state similar to a state in which accumulated electric charges of the photodiode PD are large.

Therefore, as illustrated in FIG. 11, the influence of V1 decreases in a region where V1 is larger than 0.2V. A gradient of V2 v.s. Isig is improved.

Figure 12:
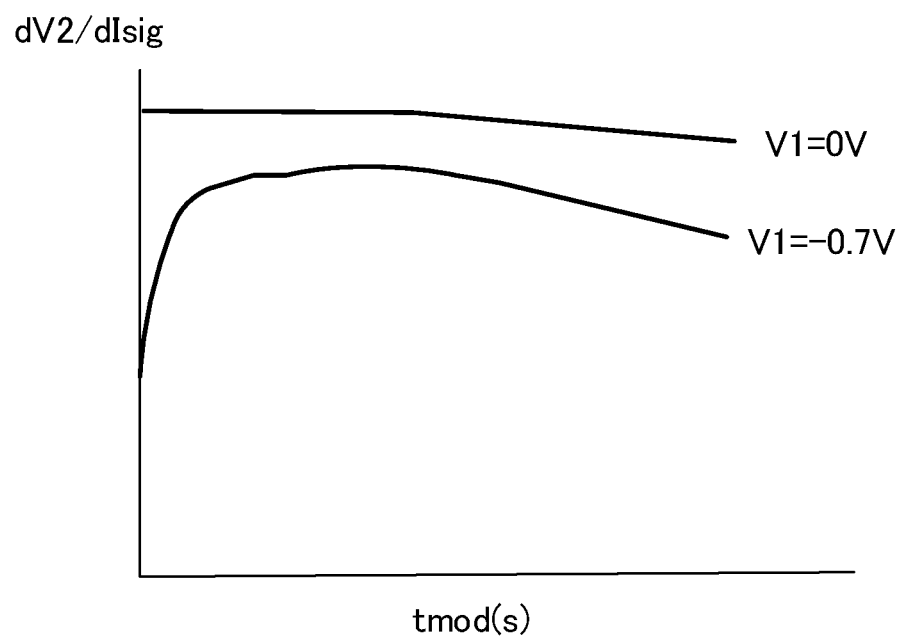
FIG. 12 is a diagram illustrating dVout/dIsig at V1=0V and V1=−0.7V in the case in which an application period of the negative pulse is changed.

FIG. 12 illustrates dVout/dIsig at V1=0V and V1=−0.7V in the case in which the negative pulse application period tmod is changed. When tmod is set long, dVout/dIsig at the time of V1=0V is deteriorated.

Consequently, it was found that, when a time of one frame is 33 ms, it is appropriate that tmod is approximately 3 to 8 ms. That is, tmod is desirably set to a period shorter than the half of one frame.

Modification 2

Figure 13:
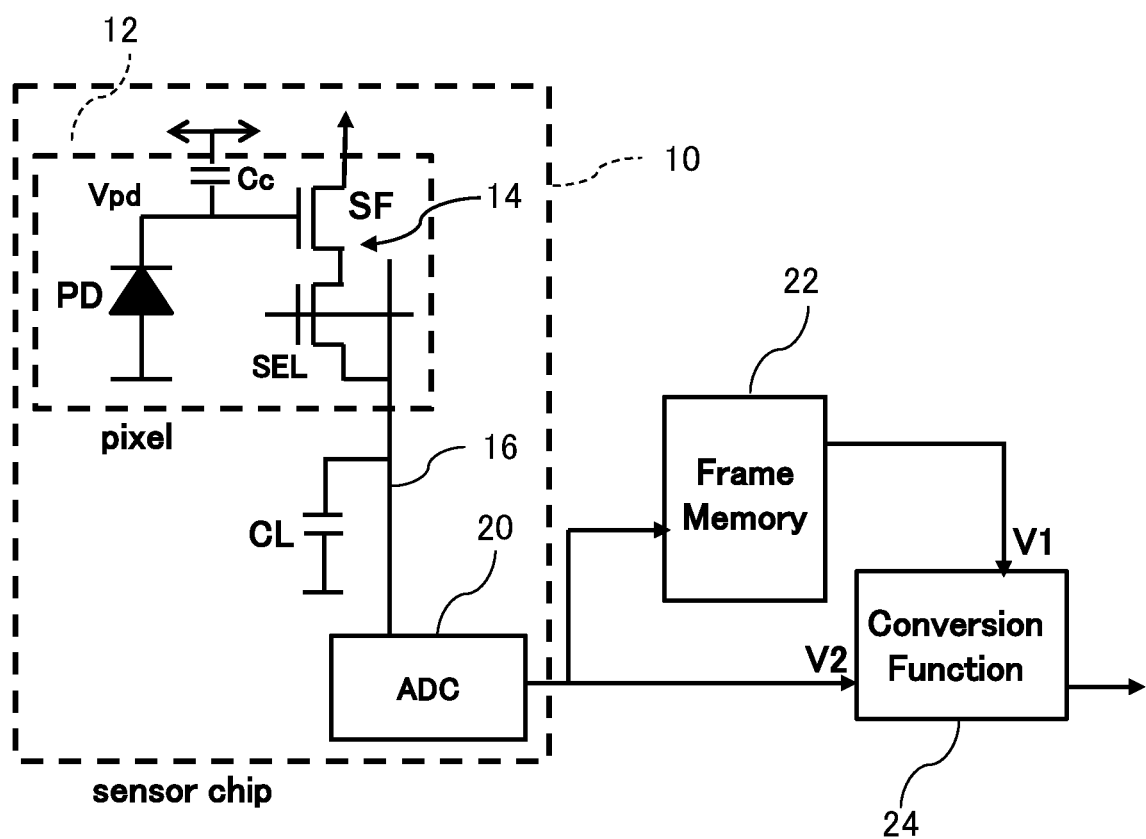
FIG. 13 is a diagram illustrating a configuration of a modification 2 in which a modulation capacitor is coupled to a PD and the negative pulse is applied.

FIG. 13 is a diagram illustrating a configuration of a modification 2. In the modification 1, the gate capacitor of the source follower transistor SF is used. In the modification 2, a capacitor Cc is connected to the output end of the photodiode PD. A negative pulse is applied to an output point of the photodiode PD via the capacitor Cc. In this case as well, it is desirable to apply the negative pulse in a period shorter than a period of the half of one frame.

With such a configuration as well, the same effects as the effects in the modification 1 are obtained.

The invention claimed is:

1. An image sensor including a plurality of pixels, the image sensor comprising:
   a photodiode configured to operate one of a linear mode for linearly responding to a light incident amount and a photo-voltaic mode for logarithmically responding to the light incident amount;
   a source follower circuit configured to output a signal voltage according to a signal charge generated according to an output of the photodiode;
   an analog-to-digital converter configured to convert the signal voltage output from the source follower circuit into digital signal data;
   a frame memory configured to store signal data of one frame; and
   a signal converter configured to generate, from signal data of a current frame and signal data of a previous frame, an optical signal relating to the light incident amount, wherein the signal converter generates the optical signal from the signal data of the current frame and the signal data of the previous frame using a Lambert W function.

2. The image sensor according to claim 1, wherein
   the source follower circuit further includes a source follower transistor with its gate connected to the output of the photodiode, and
   a negative pulse in a period shorter than a half period of one frame is applied to the photodiode via a gate capacitor of the source follower transistor.

3. The image sensor according to claim 1, further comprising a capacitor connected to the photodiode, wherein
   a negative pulse in a period shorter than a period of a half of one frame is applied to the photodiode via the capacitor.

4. An image sensor comprising:
a pixel array including a plurality of pixels arranged in a matrix,
each of the pixels including:
- a photodiode configured to operate in one of a linear mode for linearly responding to a light incident amount and a photo-voltaic mode for logarithmically responding to the light incident amount; and
- a source follower circuit configured to output a signal voltage according to a signal charge generated according to an output of the photodiode, wherein the source follower circuit further includes a source follower transistor to a gate of which the output of the photodiode is connected and a negative pulse in a period shorter than a half period of one frame is applied to the photodiode via a gate capacitor of the source follower transistor;

a vertical scan circuit configured to sequentially drive the plurality of pixels while moving in a vertical direction;
an analog-to-digital converter configured to convert the signal voltage output from the source follower circuit into digital signal data;
a frame memory configured to store signal data of one frame;
a signal converter configured to generate, from signal data of a current frame and signal data of a previous frame, an optical signal relating to the light incident amount; and
a horizontal scan circuit configured to sequentially output the optical signals of the pixels in one row.

5. An optical signal generation method for generating an optical signal relating to a light incident amount of a photodiode that operates in one of a linear mode for linearly responding to a light incident amount and a photo-voltaic mode for logarithmically responding to the light incident amount,
the optical signal generation method comprising:
extracting an output of the photodiode frame by frame without resetting an accumulated electric charge of the photodiode; and
generating, based on a signal of a current frame relating to an output in the current frame of the photodiode and a signal of a previous frame relating to an output in an immediately preceding frame of the photodiode, an optical signal relating to the light incident amount in the current frame using a signal converter provided in advance, wherein the signal converter generates the optical signal from the signal of the current frame and the signal of the previous frame using a Lambert W function.

6. An image sensor comprising:
a pixel array including a plurality of pixels arranged in a matrix,
each of the pixels including:
- a photodiode configured to operate in one of a linear mode for linearly responding to a light incident amount and a photo-voltaic mode for logarithmically responding to the light incident amount;
- a source follower circuit configured to output a signal voltage according to a signal charge generated according to an output of the photodiode; and
- a capacitor connected to the photodiode, wherein a negative pulse in a period shorter than a half period of one frame is applied to the photodiode via the capacitor;

a vertical scan circuit configured to sequentially drive the plurality of pixels while moving in a vertical direction;
an analog-to-digital converter configured to convert the signal voltage output from the source follower circuit into digital signal data;
a frame memory configured to store signal data of one frame;
a signal converter configured to generate, from signal data of a current frame and signal data of a previous frame, an optical signal relating to the light incident amount; and
a horizontal scan circuit configured to sequentially output the optical signals of the pixels in one row.

7. The image sensor of claim 6, wherein the signal converter generates the optical signal from the signal of the current frame and the signal of the previous frame using a Lambert W function.

8. The image sensor of claim 6, wherein the signal converter generates the optical signal from the signal of the current frame and the signal of the previous frame using two numerical value tables.

9. The image sensor of claim 4, wherein the signal converter generates the optical signal from the signal of the current frame and the signal of the previous frame using a Lambert W function.

10. The image sensor of claim 4, wherein the signal converter generates the optical signal from the signal of the current frame and the signal of the previous frame using two numerical value tables.

* * * * *